(12) United States Patent
Takeda et al.

(10) Patent No.: US 11,221,496 B2
(45) Date of Patent: Jan. 11, 2022

(54) DISPLAY MODULE AND DISPLAY DEVICE

(71) Applicant: SEIKO EPSON CORPORATION, Tokyo (JP)

(72) Inventors: Takashi Takeda, Suwa (JP); Akio Fukase, Chino (JP); Hiroyuki Tatsugi, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 131 days.

(21) Appl. No.: 16/811,050

(22) Filed: Mar. 6, 2020

(65) Prior Publication Data

US 2020/0285064 A1 Sep. 10, 2020

(30) Foreign Application Priority Data

Mar. 8, 2019 (JP) .............................. JP2019-042644

(51) Int. Cl.
*G02B 27/14* (2006.01)
*G02B 27/01* (2006.01)
*G02B 27/10* (2006.01)
*F21V 8/00* (2006.01)

(52) U.S. Cl.
CPC ....... *G02B 27/149* (2013.01); *G02B 27/0172* (2013.01); *G02B 27/102* (2013.01); *G02B 6/003* (2013.01); *G02B 6/0035* (2013.01); *G02B 2027/0178* (2013.01)

(58) Field of Classification Search
CPC .... G02B 27/10; G02B 27/102; G02B 27/149; G02B 27/026; G02B 27/0172; G02B 27/0178; G02B 27/0972; G02B 27/1033; G02B 27/1046; G02B 6/003; G02B 6/0035; G02B 6/34; G03B 21/006; G03B 21/28; G03B 21/14; G03B 21/145
See application file for complete search history.

(56) References Cited

U.S. PATENT DOCUMENTS

| | | | |
|---|---|---|---|
| 8,182,095 B2 * | 5/2012 | Utsunomiya | G03B 21/16 353/58 |
| 10,678,121 B2 * | 6/2020 | Nakamura | H04N 9/3164 |
| 2001/0030779 A1 * | 10/2001 | Ho | H04N 9/3167 359/20 |

FOREIGN PATENT DOCUMENTS

JP 2014-186201 A 10/2014

* cited by examiner

*Primary Examiner* — Sultan Chowdhury
(74) *Attorney, Agent, or Firm* — Oliff PLC

(57) ABSTRACT

A display module of the present disclosure includes a display module main body and a housing. The display module main body includes a first, a second display element, and a prism. The housing includes a first, and a second frame. The first frame holds the first display element in a state in which the prism is positioned between a first and a second plate portion, and in which a third plate portion is in contact with the first display element and faces a first surface, and the second frame holds the second display element in a state in which the prism is positioned between a fourth and a fifth plate portion, and in which a sixth plate portion is in contact with the second display element and faces a second surface.

12 Claims, 11 Drawing Sheets

DISPLAY MODULE AND DISPLAY DEVICE

The present application is based on, and claims priority from JP Application Serial Number 2019-042644, filed Mar. 8, 2019, the disclosure of which is hereby incorporated by reference herein in its entirety.

BACKGROUND

1. Technical Field

The present disclosure relates to a display module and a display device.

2. Related Art

In recent years, a display device, such as a head-mounted display or a head-up display, is provided that projects a virtual image in a space in front of an eye of an observer and allows the observer to visually recognize the virtual image.

JP-A-2014-186201, which will be described below, discloses a head-mounted display including an image element configured by a liquid crystal panel, a case in which the image element is housed, a projection optical system that projects light from the image element, a lens barrel that houses the projection optical system, and a light guiding device that guides the light from the projection optical system to an eye of an observer. In this head-mounted display, the case in which the image element is housed is fixed to the lens barrel, and as a result, the image element and the projection optical system are aligned with each other.

In the above-described JP-A-2014-186201, a structure is disclosed in which the single image element is fixed to the lens barrel. In contrast, in the field of projectors, for example, a display module is known that includes a plurality of display panels that emit red light, green light, and blue light, respectively, and a color synthesis element that synthesizes the plurality of color light emitted from the plurality of display panels.

In this type of display module, precise alignment of the plurality of display panels is important to ensure display quality. In addition, when applying this type of display module to a display device, such as a head-mounted display, there is a greater need to accommodate the display module in a housing of a limited size, and it is thus required to have a compact configuration. However, a display module that allows easy alignment of the plurality of display panels and has a compact configuration, is not currently available.

SUMMARY

In order to solve the above-described problems, a display module according to an aspect of the present disclosure includes a display module main body; and a housing provided to the display module main body. The display module main body includes a first display element, a second display element, and a prism configured to synthesize first light emitted from the first display element and second light emitted from the second display element, and the housing includes a first frame that holds the first display element in a state in which the first display element faces a first surface of the prism, and a second frame that holds the second display element in a state in which the second display element faces a second surface of the prism. The first frame includes a first plate portion and a second plate portion facing each other, and a third plate portion that couples the first plate portion and the second plate portion to each other, the second frame includes a fourth plate portion and a fifth plate portion facing each other, and a sixth plate portion that couples the fourth plate portion and the fifth plate portion to each other, and at least one of the first frame and the second frame includes an attachment portion for attaching the display module main body to a support member. The first frame holds the first display element in a state in which the prism is positioned between the first plate portion and the second plate portion, and in which the third plate portion is in contact with the first display element and faces the first surface, and the second frame holds the second display element in a state in which the prism is positioned between the fourth plate portion and the fifth plate portion, and in which the sixth plate portion is in contact with the second display element and faces the second surface.

In the display module according to an aspect of the present disclosure, the first frame and the second frame may contain a metal material, the first frame and the first display element may be thermally coupled, and the second frame and the second display element may be thermally coupled.

In the display module according to an aspect of the present disclosure, each of the first plate portion and the second plate portion of the first frame may be provided with a step portion that defines, by coming into contact with a portion of the first surface of the prism, a distance between the first display element and the first surface, and each of the fourth plate portion and the fifth plate portion of the second frame may be provided with a step portion that defines, by coming into contact with a portion of the second surface of the prism, a distance between the second display element and the second surface.

In the display module according to an aspect of the present disclosure, the display module main body may further include a third display element, the prism may synthesize the first light, the second light, and third light emitted from the third display element, and the housing may further include a third frame that holds the third display element in a state in which the third display element faces a third surface of the prism. The third frame may include a seventh plate portion and an eighth plate portion facing each other, and a ninth plate portion that couples the seventh plate portion and the eighth plate portion to each other, and the third frame may hold the third display element in a state in which the prism is positioned between the seventh plate portion and the eighth plate portion, and in which the third plate portion is in contact with the third display element and faces the third surface.

In the display module according to an aspect of the present disclosure, the third frame may contain metal material, and the third frame and the third display element may be thermally coupled.

In the display module according to an aspect of the present disclosure, each of the seventh plate portion and the eighth plate portion of the third frame may be provided with a step portion that defines, by coming into contact with a portion of the third surface of the prism, a distance between the third display element and the third surface.

In the display module according to an aspect of the present disclosure, the first surface and the second surface of the prism may face each other, the third surface may be positioned in a direction intersecting the first surface and the second surface, and a first clamping portion or a second clamping portion may be provided, the first clamping portion being configured such that a portion of the seventh plate portion and the prism clamp a portion of the first plate portion and a portion of the fourth plate portion, and the second clamping portion being configured such that a portion of the eighth plate portion and the prism clamp a portion of the second plate portion and a portion of the fifth plate portion.

In the display module according to an aspect of the present disclosure, one of the first clamping portion and the second clamping portion may be provided with a through hole, and the through hole may be provided therein with a coupling member coupling the first frame and the third frame, and coupling the second frame and the third frame.

In the display module according to an aspect of the present disclosure, one of the first clamping portion and the second clamping portion may be provided with fitting portions that couple, by fitting to each other, the first frame and the third frame, and couple the second frame and the third frame.

In the display module according to an aspect of the present disclosure, the attachment portion may be provided in each of the first frame and the second frame.

In the display module according to an aspect of the present disclosure, the attachment portion may be provided with a positional adjustment mechanism for adjusting a position of the display module main body with respect to the support member.

A display device according to an aspect of the present disclosure includes the display module according to an aspect of the present disclosure.

DESCRIPTION OF EXEMPLARY EMBODIMENTS

First Embodiment

A first embodiment of the present disclosure will be described below with reference to FIG. 1 to FIG. 10.

In the first embodiment, a display module provided with three display panels and a prism will be described as an example.

In each of the drawings below, dimensions of some components may be scaled differently for ease of visual understanding of each of the components.

Figure 1:
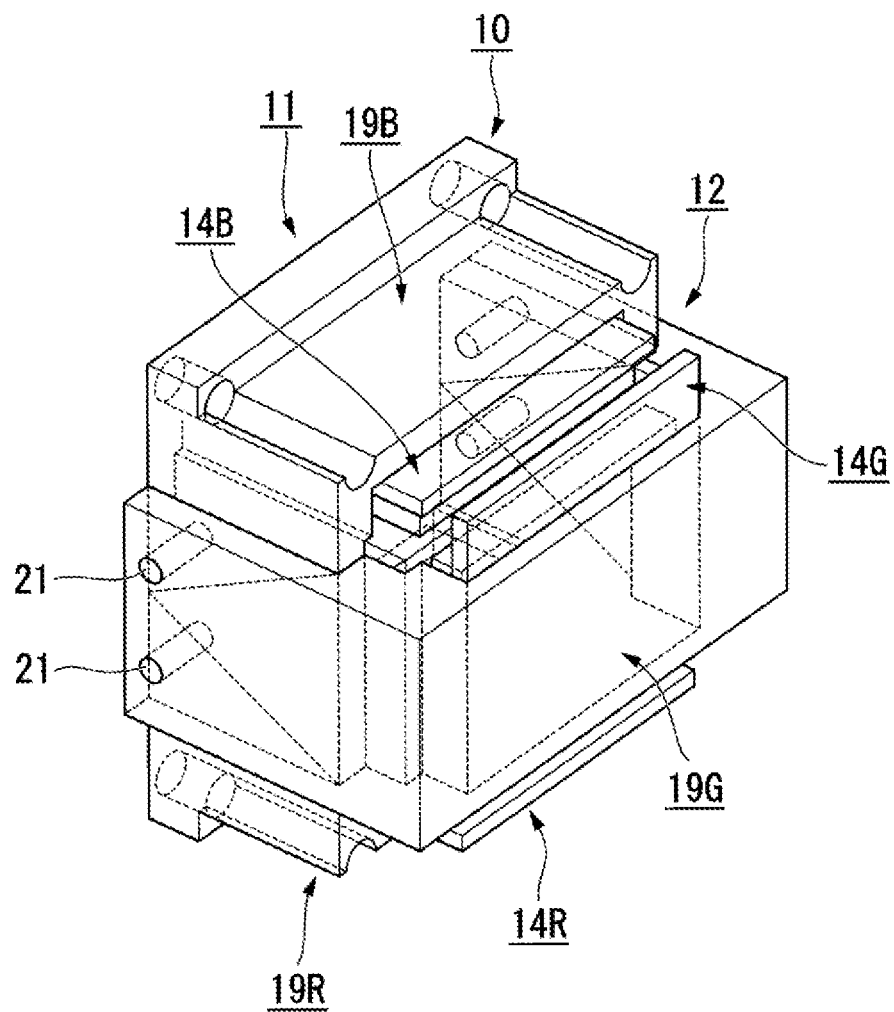
FIG. 1 is a perspective view of a display module according to a first embodiment.

FIG. 1 is a perspective view of a display module 10 of the first embodiment.

As illustrated in FIG. 1, the display module 10 includes a display module main body 11 and a housing 12 provided on the display module main body 11.

Figure 2:
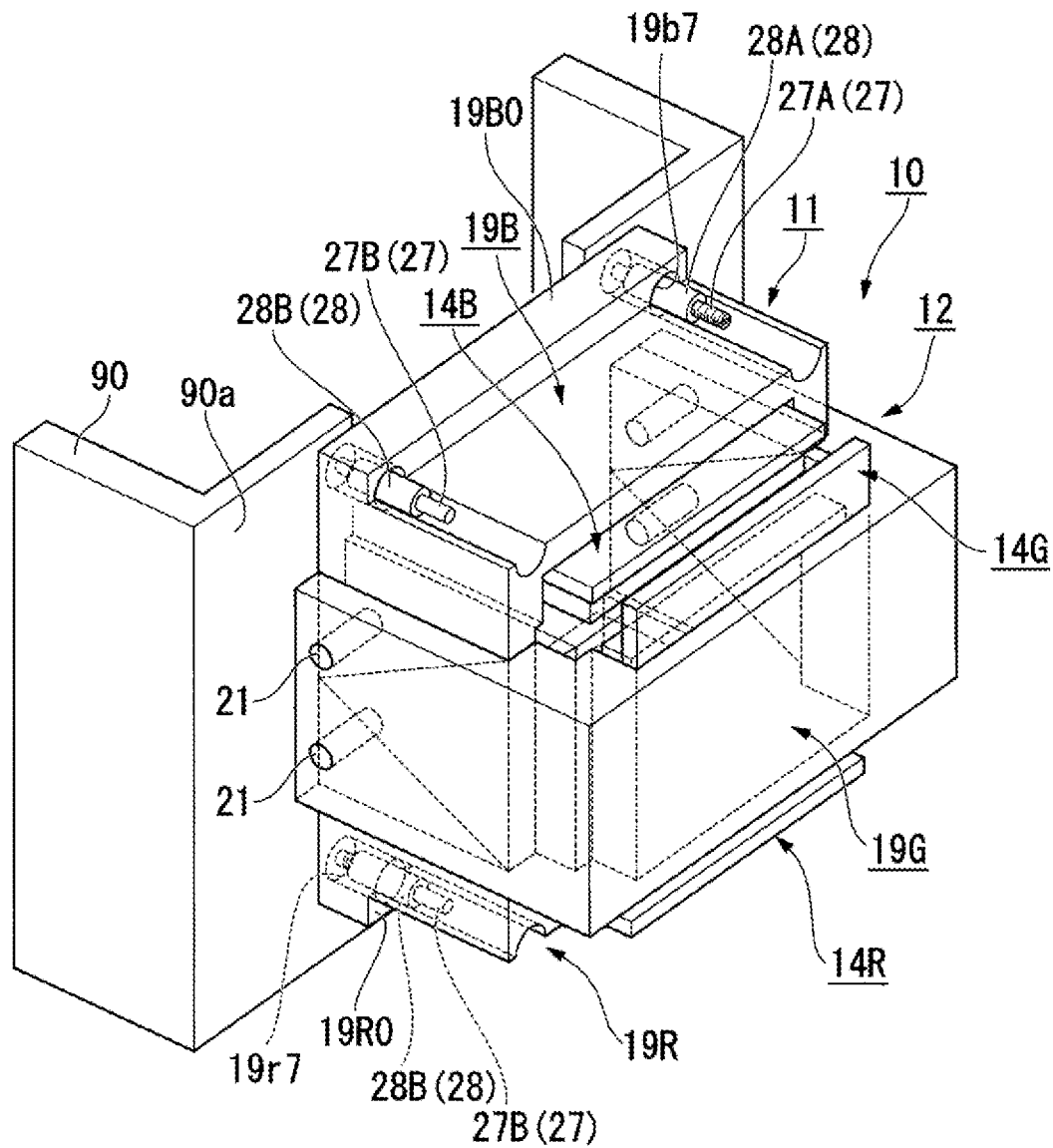
FIG. 2 is a perspective view illustrating a state in which the display module is attached to a support member.

FIG. 2 is a perspective view illustrating a state in which the display module 10 is attached to a subframe 90 (a support member) of a display device.

The display module 10 is used in a display device, such as a head-mounted display, a head-up display, and the like. When the display module 10 is mounted on the display device, as illustrated in FIG. 2, the display module 10 is attached to a chosen support member configuring the display device, via a first attachment portion and a second attachment portion, which will be described later. In this embodiment, the subframe 90 accommodating a light guiding optical system, which is a subsequent stage of the display module 10, is used as the support member, but the support member to which the display module 10 is fixed is not particularly limited.

Figure 3:
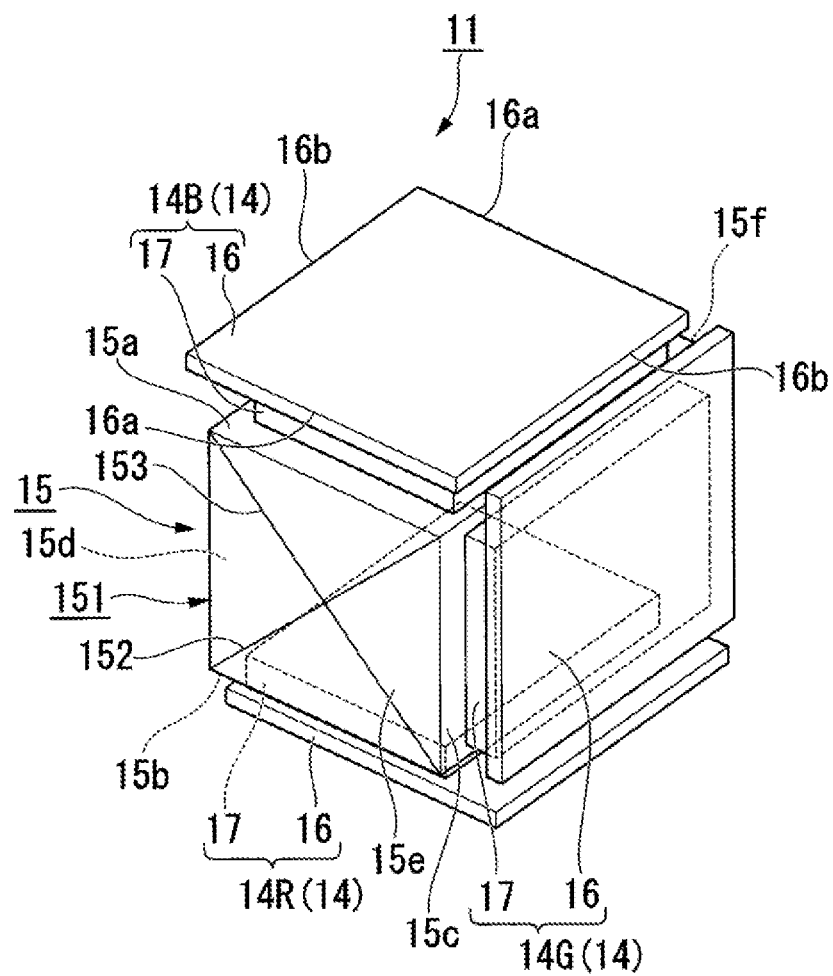
FIG. 3 is a perspective view of a display module main body.

FIG. 3 is a perspective view of the display module main body 11.

As illustrated in FIG. 3, the display module main body 11 includes a blue display panel 14B (a first display element), a red display panel 14R (a second display element), a green display panel 14G (a third display element), and a prism 15. The blue display panel 14B emits blue light (first light). The red display panel 14R emits red light (second light). The green display panel 14G emits green light (third light). The prism 15 synthesizes the blue light emitted from the blue display panel 14B, the red light emitted from the red display panel 14R, and the green light emitted from the green display panel 14G.

The blue display panel 14B, the red display panel 14R, and the green display panel 14G differ from each other in terms of the color of the emitted light, namely, the display color, but have substantially the same configuration. Thus, in the following description, these display panels 14B, 14R, 14G will be simply referred to as a display panel, and a configuration of a display panel 14 will be described.

The display panel 14 includes an element substrate 16 and a sealing substrate 17. A first surface of the element substrate 16 is provided with a plurality of organic electroluminescence (EL) elements arranged in a matrix pattern. Each of the plurality of organic EL elements configures a pixel, and a region in which the plurality of organic EL elements are arranged in the matrix pattern is an image display region. An image of each of the colors is formed by controlling emission/non-emission of each of the organic EL elements on the element substrate 16 corresponding to each of the colors. The element substrate 16 is formed by a semiconductor substrate made of silicon and the like, for example.

The sealing substrate 17 is provided facing the first surface of the element substrate 16. By covering the plurality of organic EL elements, the sealing substrate 17 inhibits moisture, dust, and the like from entering a formation region of the plurality of organic EL elements. The sealing substrate 17 is formed by a transparent substrate made of glass and the like, for example.

The prism 15 is provided with four triangular prismatic prisms 151 and two dichroic mirrors 152 and 153. The prism 15 has a configuration in which the four triangular prismatic prisms 151 are adhered to each other, and has a substantially rectangular parallelepiped shape as a whole. The two dichroic mirrors 152 and 153 are each provided on adhesion surfaces of the triangular prismatic prisms 151. Of six surfaces forming the outer shape of the rectangular parallelepiped prism 15, a surface facing the blue display panel 14B is a first surface 15a, a surface facing the red display panel 14R is a second surface 15b, and a surface facing the green display panel 14G is a third surface 15c. The first surface 15a and the second surface 15b face each other, and a surface facing the third surface 15c is a fourth surface 15d. The remaining two surfaces are a fifth surface 15e and a sixth surface 15f, respectively.

When the prism 15 is viewed from the normal direction of the fifth surface 15e or of the sixth surface 15f, the two dichroic mirrors 152 and 153 are provided intersecting each other so as to form an X shape in the fifth surface 15e or the sixth surface 15f. The first dichroic mirror 152 has characteristics of reflecting the blue light and transmitting the green light and the red light. The second dichroic mirror 153 has characteristics of reflecting the red light and transmitting the green light and the blue light.

The blue light emitted from the blue display panel 14B is incident on the prism 15 from the first surface 15a. The red light emitted from the red display panel 14R is incident on the prism 15 from the second surface 15b. The green light emitted from the green display panel 14G is incident on the prism 15 from the third surface 15c. The blue light incident on the prism 15 is reflected by the first dichroic mirror 152 and travels toward the fourth surface 15d. The red light incident on the prism 15 is reflected by the second dichroic mirror 153 and travels toward the fourth surface 15d. The green light incident on the prism 15 is transmitted through the first dichroic mirror 152 and the second dichroic mirror 153, and travels toward the fourth surface 15d. In this way, the prism 15 synthesizes the blue light emitted from the blue display panel 14B, the red light emitted from the red display panel 14R, and the green light emitted from the green display panel 14G. The synthesized light is emitted from the fourth surface 15d of the prism 15.

In this embodiment, each of the display panels 14 is fixed to the prism 15 via an optical adhesive (not illustrated) so that the sealing substrate 17 faces each of the surfaces of the prism 15. Thus, the blue display panel 14B is provided so that the sealing substrate 17 comes into contact with the first surface 15a of the prism 15 via the optical adhesive. The red display panel 14R is provided so that the sealing substrate 17 comes into contact with the second surface 15b of the prism 15 via the optical adhesive. The green display panel 14G is provided so that the sealing substrate 17 comes into contact with the third surface 15c of the prism 15 via the optical adhesive.

Light emitted from the organic EL element is not emitted from the element substrate 16 that is not transmissive, but is emitted from the sealing substrate 17 that is transmissive, and is incident on the prism 15. Note that each of the display panels 14 need not necessarily be in contact with each of the surfaces of the prism 15 via the optical adhesive, but may be in contact with each of the surfaces of the prism 15 without having the optical adhesive interposed therebetween. Further, each of the display panels 14 may be disposed so as to be separated from the prism 15 in a state of being held by the housing 12. That is, a gap may be provided between each of the display panels 14 and each of the surfaces of the prism 15.

In each of the display panels 14, the element substrate 16 is disposed so that one end portion of the element substrate 16 does not face the prism 15 and protrudes outward from the prism 15. Of the element substrate 16, a region of the one end portion that does not face the prism 15 is a region that is outside the image display region and is a region in which a circuit, a wiring line, an external connection terminal, and the like for driving a plurality of the pixels are provided. Further, an external circuit board, such as a flexible printed circuit board (FPC) on which a driving circuit element is mounted, may be coupled to the external connection terminal. In this embodiment, the shape of the element substrate 16 is a rectangular shape, and of four sides of the element substrate 16, two sides, a portion of each of which protrudes outward, are defined as first sides 16a, and two sides orthogonal to the first sides 16a are defined as second sides 16b.

The blue display panel 14B is disposed so that the one end portion of the element substrate 16 protrudes toward a light emission side of the synthesized light (the outer side of the fourth surface 15d of the prism 15). In contrast to the blue display panel 14B, the red display panel 14R is disposed so that the one end portion of the element substrate 16 protrudes toward the opposite side (the outer side of the third surface 15c of the prism 15) to the light emission side of the synthesized light. The green display panel 14G is disposed so that the one end of the element substrate 16 protrudes toward the side of the blue display panel 14B (the outer side of the first surface 15a of the prism 15). Specifically, when the display module main body 11 is viewed from the side of the fifth surface 15e, the blue display panel 14B protrudes from the prism 15 to the left side, the red display panel 14R protrudes from the prism 15 to the right side, and the green display panel 14G protrudes from the prism 15 to the upper side. With this arrangement, it is possible to reduce the size of the prism 15. However, the arrangement of each of the display panels 14 is not limited to this example, and may be changed as appropriate.

As illustrated in FIG. 1. and FIG. 2, the housing 12 includes a blue panel frame 19B (a first frame), a red panel frame 19R (a second frame), a green panel frame 19G (a third frame), and a plurality of fixing pins 21 (coupling members). The blue panel frame 19B holds the blue display panel 14B in a state in which the blue display panel 14B faces the first surface 15a of the prism 15. The red panel frame 19R holds the red display panel 14R in a state in which the red display panel 14R faces the second surface 15b of the prism 15. The green panel frame 19G holds the green display panel 14G in a state in which the green display panel 14G faces the third surface 15c of the prism 15.

A detailed configuration of each of the frames 19B, 19R, and 19G will be described below along with an assembly process of the display module 10.

Figure 4A:
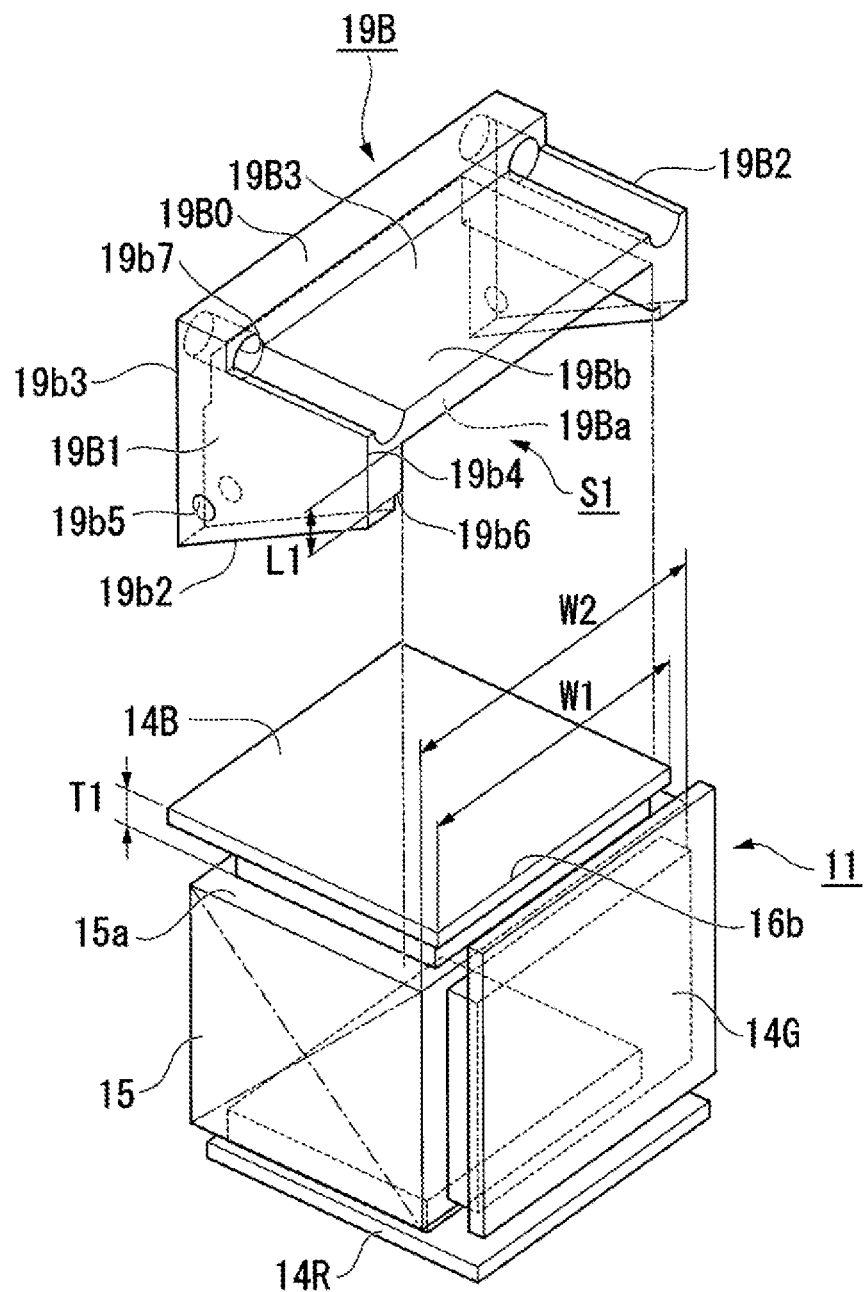
FIG. 4A is a perspective view illustrating a state before attaching a blue panel frame to the display module main body.
Figure 4B:
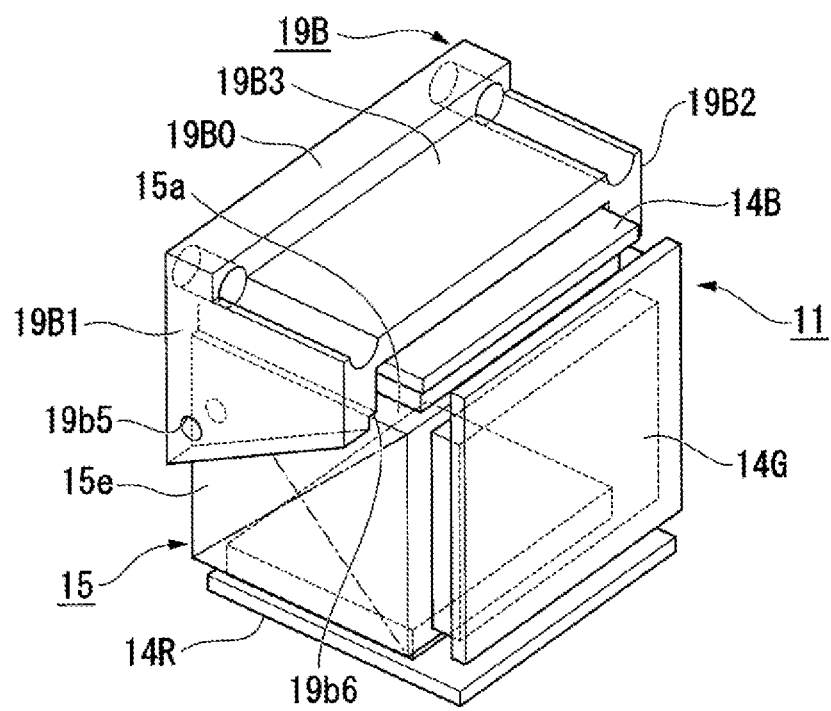
FIG. 4B is a perspective view illustrating a state after attaching the blue panel frame to the display module main body.

FIG. 4A is a perspective view illustrating a state before attaching the blue panel frame 19B to the display module main body 11. FIG. 4B is a perspective view illustrating a state after attaching the blue panel frame 19B to the display module main body 11.

Figure 5:
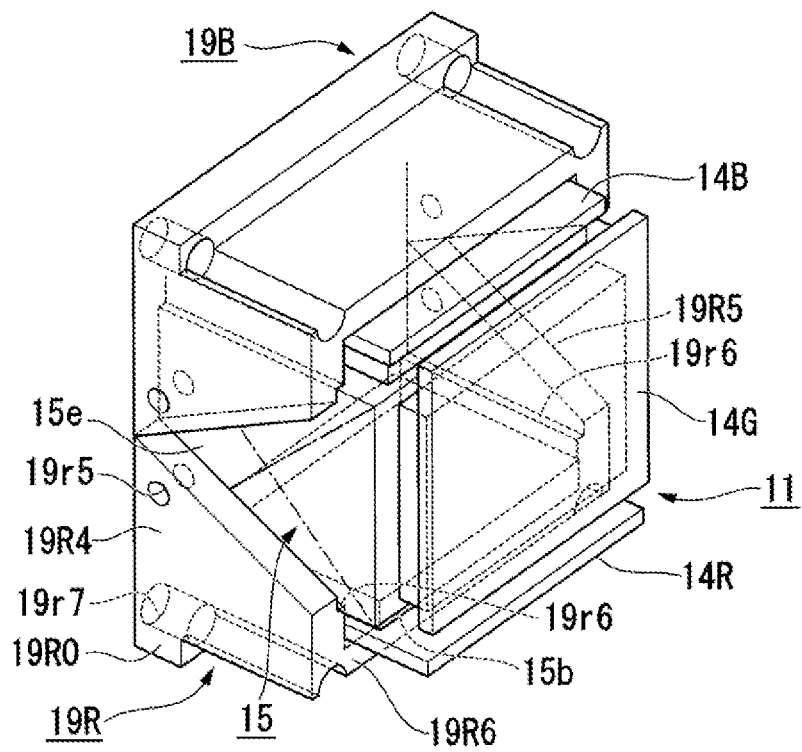
FIG. 5 is a perspective view illustrating a state after attaching the blue panel frame and a red panel frame to the display module main body.

FIG. 5 is a perspective view illustrating a state after attaching the blue panel frame 19B and the red panel frame 19R to the display module main body 11.

Figure 6A:
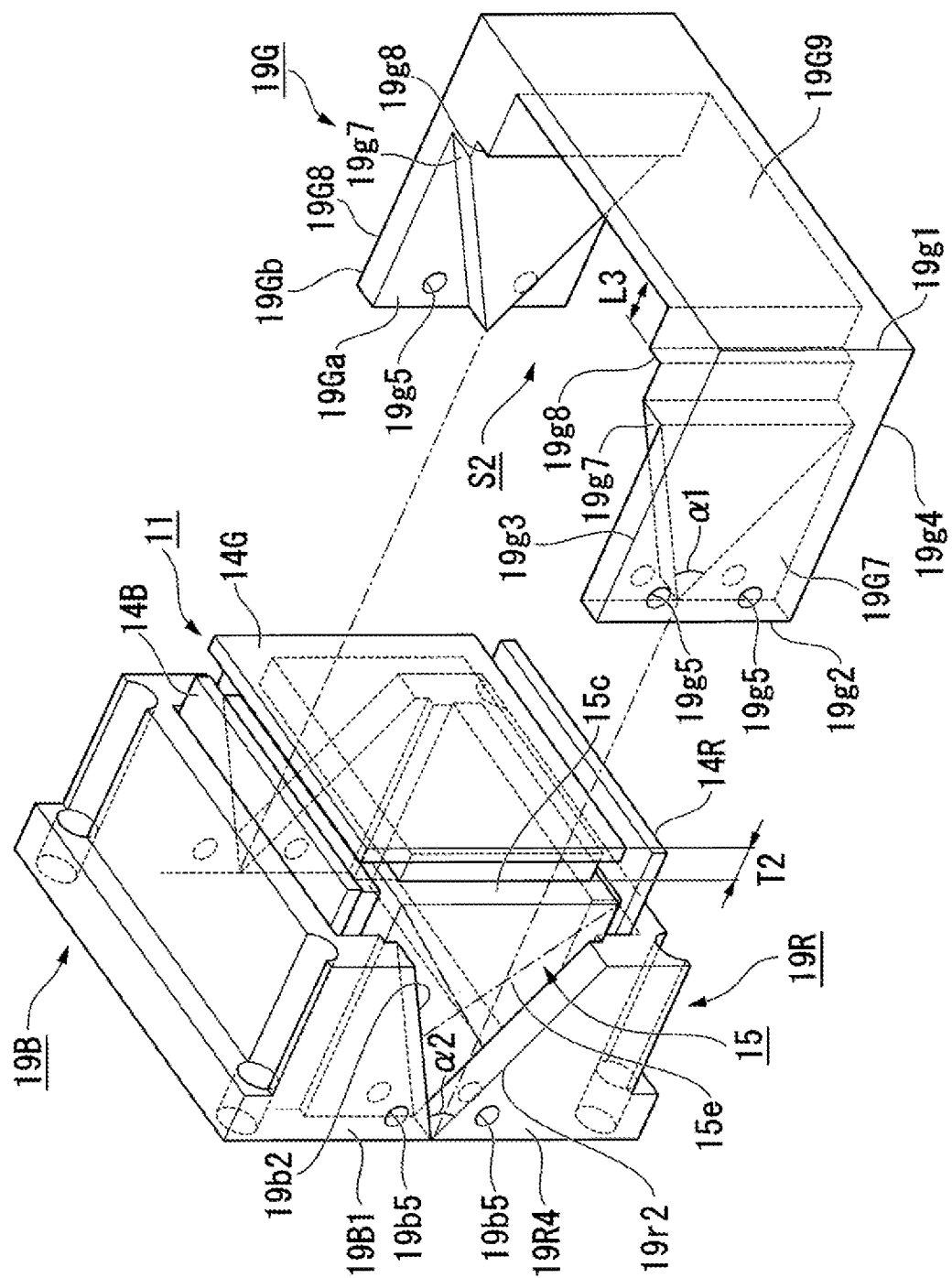
FIG. 6A is a perspective view illustrating a state before attaching a green panel frame to the display module main body.
Figure 6B:
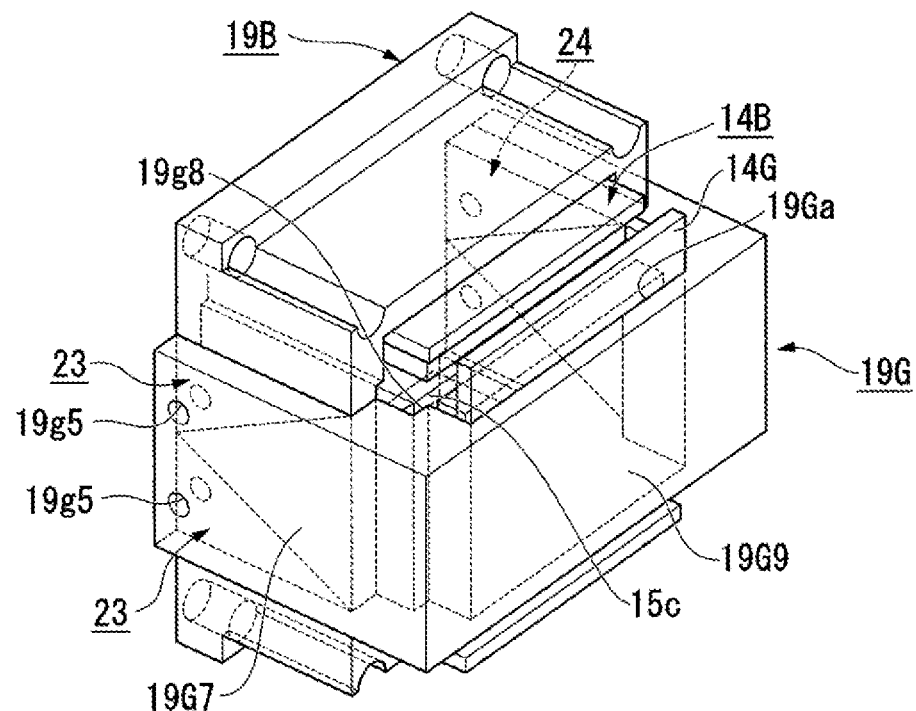
FIG. 6B is a perspective view illustrating a state after attaching the green panel frame to the display module main body.

FIG. 6A is a perspective view illustrating a state before attaching the green panel frame 19G to the display module main body 11. FIG. 6B is a perspective view illustrating a state after attaching the green panel frame 19G to the display module main body 11.

Figure 7:
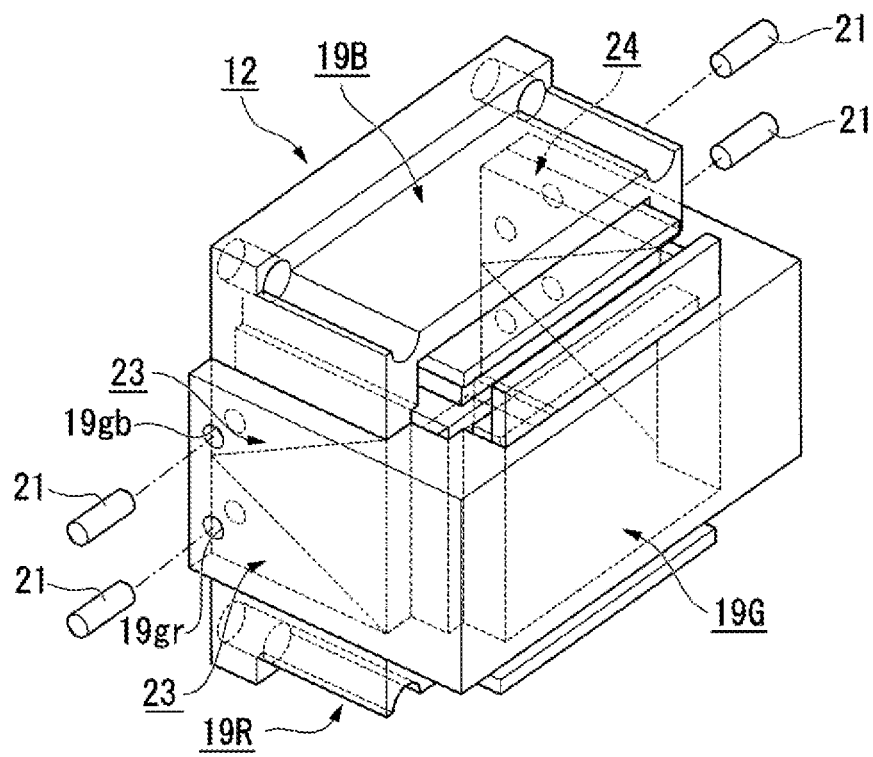
FIG. 7 is a perspective view illustrating a state before attaching fixing pins to the display module main body.

FIG. 7 is a perspective view illustrating a state before attaching the fixing pins 21 to the display module main body 11.

The assembly process according to this embodiment will be described using an example in which each of the blue display panel 14B, the red display panel 14R, and the green display panel 14G is temporarily fixed to the prism 15 in advance, before attaching each of the frames 19B, 19R, and 19G to the display module main body 11.

As illustrated in FIG. 4A, the blue panel frame 19B includes a first plate portion 19B1 and a second plate portion 19B2 that face each other, a third plate portion 19B3 that couples the first plate portion 19B1 and the second plate portion 19B2, and a first attachment portion 19B0. The first plate portion 19B1, the second plate portion 19B2, the third plate portion 19B3, and the first attachment portion 19B0 are formed from one piece of a plate material. The first plate portion 19B1 and the third plate portion 19B3 are formed to form an angle of approximately 90°. The second plate portion 19B2 and the third plate portion 19B3 are formed to form an angle of approximately 90°. As a result, the prism 15 is accommodated in a space surrounded by the first plate portion 19B1, the second plate portion 19B2, and the third plate portion 19B3. The blue panel frame 19B is formed from, for example, a metal material such as aluminum, titanium, magnesium, and alloys of these metals, or a plastic containing carbon fibers.

Hereinafter, the space surrounded by the first plate portion 19B1, the second plate portion 19B2, and the third plate portion 19B3, and in which the prism 15 is accommodated will be referred to as an accommodating space S1. Further, of surfaces of the first plate portion 19B1, the second plate portion 19B2, and the third plate portion 19B3, a surface on a side facing the accommodating space S1 is referred to as a first surface 19Ba, and a surface on the opposite side to the first surface 19Ba is referred to as a second surface 19Bb.

The first plate portion 19B1 has a trapezoidal shape when viewed from the normal direction of the second surface 19Bb of the first plate portion 19B1. In other words, of the four sides of the trapezoid that forms the outer shape of the first plate portion 19B1, a second side 19b2 opposite to a first side 19b1, which is a side coupled to the third plate portion 19B3, extends obliquely with respect to the first side 19b1. The remaining sides, namely, a third side 19b3 and a fourth side 19b4 are parallel to each other and extend perpendicularly with respect to the first side 19b1. A through hole 19b5 penetrating through the first plate portion 19B1 in the plate thickness direction is provided in the vicinity of a corner portion in which the second side 19b2 and the third side 19b3 meet at an acute angle.

Further, the first surface 19Ba of the first plate portion 19B1 is provided with a step portion 19b6 that protrudes toward the accommodating space S1 side. A dimension W1 of the second side 16b of the blue display panel 14B is shorter than a dimension W2 of one side of the prism 15 parallel to the second side 16b. In other words, W1<W2. Thus, of the first surface 15a of the prism 15, regions on both sides of a region to which the blue display panel 14B is bonded become exposed sections that are exposed from the blue display panel 14B. In a state in which the blue panel frame 19B is attached to the display module main body 11, the step portion 19b6 comes into contact with the exposed section of the first surface 15a of the prism 15.

Further, a dimension L1 from the first surface 19Ba of the third plate portion 19B3 to the step portion 19b6 is substantially equal to a thickness T1 of the blue display panel 14B. In other words, L1=T1. Strictly speaking, the dimension L1 from the first surface 19Ba of the third plate portion 19B3 to the step portion 19b6 is equal to a total thickness of the thickness T1 of the blue display panel 14B and the thickness of the optical adhesive.

In this case, as illustrated in FIG. 4B, when the step portion 19b6 is brought into contact with a portion of the first surface 15a of the prism 15, the first surface 19Ba of the third plate portion 19B3 comes into contact with the blue display panel 14B. In other words, in the case of this embodiment, since the first surface 19Ba of the third plate portion 19B3 and the blue display panel 14B are in contact with each other, the blue display panel 14B comes into contact with the first surface 15a of the prism 15. Specifically, a distance between the blue display panel 14B and the first surface 15a of the prism 15 becomes zero.

As will be described below, although the blue display panel 14B and the third plate portion 19B3 are required be in contact with each other from a perspective of thermal conduction, the blue display panel 14B and the prism 15 need not necessarily be in contact with each other, and there may be a gap between the blue display panel 14B and the first surface 15a of the prism 15. When a gap is provided between the blue display panel 14B and the prism 15, the dimension L1 from the first surface 19Ba of the third plate portion 19B3 to the step portion 19b6 is set to be equal to a dimension obtained by adding the dimension of the gap to the thickness T1 of the blue display panel 14B. In this way, the step portion 19b6 defines the distance between the blue display panel 14B and the first surface 15a of the prism 15 by coming into contact with the portion of the first surface 15a of the prism 15.

As illustrated in FIG. 4A, the second plate portion 19B2 has the same configuration as the first plate portion 19B1. The second plate portion 19B2 is provided symmetrically with respect to the first plate portion 19B1 on an end portion of the third plate portion 19B3 on the opposite side to the side on which the first plate portion 19B1 is provided. Thus, a description of the second plate portion 19B2 is omitted here.

The first attachment portion 19B0 is provided along the edge of the second surface 19Bb of the third plate portion 19B3. The first attachment portion 19B0 is configured by a wall portion protruding from the second surface 19Bb of the third plate portion 19B3. The first attachment portion 19B0 is configured as a member integrally formed with the third plate portion 19B3. A through hole 1967 penetrating through the first attachment portion 19B0 in a direction along the second surface 19Bb of the third plate portion 19B3 is provided in the first attachment portion 19B0. The first attachment portion 19B0 functions as a member for attaching the display module main body 11 to the support member.

As illustrated in FIG. 5, the red panel frame 19R includes a fourth plate portion 19R4 and a fifth plate portion 19R5 that face each other, a sixth plate portion 19R6 that couples the fourth plate portion 19R4 and the fifth plate portion 19R5, and a second attachment portion 19R0. Further, both a through hole 19r5 and a step portion 19r6 are provided in each of the fourth plate portion 19R4 and the fifth plate portion 19R5. A through hole 19r7 is provided in the second attachment part 19R0. In this way, the red panel frame 19R has the same configuration as the blue panel frame 19B. Thus, a detailed description of each portion of the red panel frame 19R is omitted here.

As illustrated in FIG. 6A, the green panel frame 19G includes a seventh plate portion 19G7 and an eighth plate portion 19G8 that face each other, and a ninth plate portion 19G9 that couples the seventh plate portion 19G7 and the eighth plate portion 19G8. In the green panel frame 19G, the display module main body 11 is accommodated in a space S2 surrounded by the seventh plate portion 19G7, the eighth plate portion 19G8, and the ninth plate portion 19G9. Similarly to the blue panel frame 19B, the green panel frame 19G is formed from, for example, a metal material such as aluminum, titanium, magnesium, and alloys of these metals, or a plastic containing carbon fibers.

Hereinafter, the space which is surrounded by the seventh plate portion 19G7, the eighth plate portion 19G8, and the ninth plate portion 19G9, and in which the display module main body 11 is accommodated will be referred to as the accommodating space S2. Further, of surfaces of the seventh plate portion 19G7, the eighth plate portion 19G8, and the ninth plate portion 19G9, a surface on a side facing the accommodating space S2 is referred to as a first surface 19Ga, and a surface on the opposite side to the first surface 19Ga is referred to as a second surface 19Gb.

The seventh plate portion 19G7 has a rectangular shape when viewed from the normal direction of the second surface 19Gb of the seventh plate portion 19G7. In other words, of the four rectangular sides forming the outer shape of the seventh plate portion 19G7, a second side 19g2 facing a first side 19g1, which is a side coupled to the ninth plate portion 19G9, extends in parallel to the first side 19g1. A third side 19g3 and a fourth side 19g4 are parallel to each other and extend perpendicularly with respect to the first side 19g1 and the second side 19g2. Through holes 19g5 penetrating through the seventh plate portion 19G7 in the plate thickness direction are respectively provided in the vicinity of a corner portion in which the second side 19g2 and the third side 19g3 meet and a corner portion in which the second side 19g2 and the fourth side 19g4 meet.

Further, in the first surface 19Ga of the seventh plate portion 19G7, a first step portion 19g7 that protrudes toward the accommodating space S2 side is provided. When viewed from the normal direction of the first surface 19Ga of the seventh plate portion 19G7, the first step portion 19g7 is provided so as to form an isosceles triangular shape having the bottom side on a side of the first side 19g1 of the seventh plate portion 19G7 and the apex on a side of the second side 19g2. An apex angle α1 of the isosceles triangle forming the shape of the first step portion 19g7 matches an apex angle α2 of an isosceles triangle formed by the second side 19b2 of the first plate portion 19B1 and the second side 19r2 of the fourth plate portion 19R4 when the blue panel frame 19B and the red panel frame 19R are attached to the display module main body 11. In this case, the first step portion 19g7 comes into contact with an end face of the first plate portion 19B1 and an end face of the fourth plate portion 19R4. However, the apex angle α1 need not necessarily match the apex angle α2, and may be smaller than the apex angle α2. In this case, the first step portion 19g7 does not come into contact with the end face of the first plate portion 19B1 and the end face of the fourth plate portion 19R4.

Further, in the first surface 19Ga of the seventh plate portion 19G7, a second step portion 19g8 that protrudes further from the first step portion 19g7 toward the accommodating space S2 side is provided. The second step portion 19g8 has a similar configuration and a similar function to the step portion 19b6 described above in relation to the blue panel frame 19B.

In other words, a dimension L3 from the first surface 19Ga of the ninth plate portion 19G9 to the second step portion 19g8 is substantially equal to a thickness T2 of the green display panel 14G. That is, L3≠T2. Strictly speaking, the dimension L3 from the first surface 19 Ga to the second stepped portion 19g8 of the ninth plate portion 19G9 is equal to a total thickness of the thickness T2 of the green display panel 14G and the thickness of the optical adhesive.

In this case, as illustrated in FIG. 6B, when the second stepped portion 19g8 is brought into contact with a portion of the third surface 15c of the prism 15, the first surface 19Ga of the ninth plate portion 19G9 comes into contact with the green display panel 14G. In other words, in the case of the present embodiment, since the first surface 19Ga of the ninth plate portion 19G9 and the green display panel 14G are in contact with each other, the green display panel 14G and the third surface 15c of the prism 15 also come into contact with other. Specifically, a distance between the green display panel 14G and the third surface 15c of the prism 15 becomes zero. In this way, the second stage portion 19g8 defines the distance between the green display panel 14G and the third surface 15c of the prism 15 by coming into contact with the portion of the third surface 15c of the prism 15.

The eighth plate portion 19G8 has the same configuration as the seventh plate portion 19G7. The eighth plate portion 19G8 is provided symmetrically with respect to the seventh plate portion 19G7 on an end portion of the ninth plate portion 19G9 on the opposite side to the side on which the seventh plate portion 19G7 is provided. Thus, a description of the eighth plate portion 19G8 is omitted here.

An example of the assembly process of the display module 10 will be described below.

First Step

First, as illustrated in FIG. 3, the blue display panel 14B, the red display panel 14R, and the green display panel 14G are temporarily fixed to the prism 15 using the optical adhesive. For example, an ultraviolet-curable optical adhesive can be used as the optical adhesive. In this step, each of the display panels 14 is roughly aligned with the prism 15 using a chosen alignment mark or the like, for example. Further, while keeping the optical adhesive from being completely cured, a state is maintained in which relative positions of the blue display panel 14B, the red display panel 14R, and the green display panel 14G with respect to the prism 15 can be finely adjusted. By this step, the display module main body 11 is manufactured.

Second Step

Next, as illustrated in FIG. 4A, the blue panel frame 19B is attached to the display module main body 11. At this time, as illustrated in FIG. 4B, the blue panel frame 19B is fitted into the display module main body 11 up to a position at which the step portions 19b6 of the first plate portion 19B1 and the second plate portion 19B2 come into contact with the first surface 15a of the prism 15. At this time, a portion of the first plate portion 19B1 closer to a tip end side thereof than the step portion 19b6 comes into contact with the fifth surface 15e of the prism 15, a portion of the second plate portion 19B2 closer to a tip end side thereof than the step portion (not illustrated) of the second plate portion 19B2 comes into contact with the sixth surface 15f of the prism 15, and a state is obtained in which the first plate portion 19B1 and the second plate portion 19B2 clamp the prism 15 from the outer sides of the fifth surface 15e and the sixth surface 15*f*. Since, in this way, there is no gap between the first plate portion 19B1 and the prism 15, and between the second plate portion 19B2 and the prism 15, the blue panel frame 19B does not shift in the direction in which the first plate portion 19B1 and the second plate portion 19B2 face each other.

Further, the third plate portion 19B3 comes into contact with the blue display panel 14B, and a state is obtained in which the third plate portion 19B3 presses the blue display panel 14B toward the prism 15. In this way, the blue panel frame 19B holds the blue display panel 14B in a state in which the prism 15 is positioned between the first plate portion 19B1 and the second plate portion 19B2, and the third plate portion 19B3 is in contact with the blue display panel 14B and faces the first surface 15*a* of the prism 15. At this time, the blue panel frame 19B and the blue display panel 14B are thermally coupled at the third plate portion 19B3.

Third Step

Next, the red panel frame 19R is attached to the display module main body 11. This attachment method is the same as the attachment method for the blue panel frame 19B in the second step. In other words, as illustrated in FIG. 5, the red panel frame 19R is fitted into the display module main body 11 from a direction opposite to the blue panel frame 19B up to a position at which the step portions 19*r*6 of the fourth plate portion 19R4 and the fifth plate portion 19R5 come into contact with the second surface 15*b* of the prism 15.

At this time, a portion of the fourth plate portion 19R4 closer to a tip end side thereof than the step portion 19*r*6 comes into contact with the fifth surface 15*e* of the prism 15, a portion of the fifth plate portion 19R5 closer to a tip end side thereof than the step portion 19*r*6 comes into contact with the sixth surface 15*f* of the prism 15, and a state is obtained in which the fourth plate portion 19R4 and the fifth plate portion 19R5 clamp the prism 15 from the outer sides of the fifth surface 15*e* and the sixth surface 15*f*.

Further, the sixth plate portion 19R6 comes into contact with the red display panel 14R, and the sixth plate portion 19R6 presses the red display panel 14R toward the prism 15. In this way, the red panel frame 19R holds the red display panel 14R in a state in which the prism 15 is positioned between the fourth plate portion 19R4 and the fifth plate portion 19R5, and the sixth plate portion 19R6 is in contact with the red display panel 14R and faces the second surface 15*b* of the prism 15. At this time, the red panel frame 19R and the red display panel 14R are thermally coupled in the sixth plate portion 19R6.

Note that the order in which the blue panel frame 19B and the red panel frame 19R are attached to the display module main body 11 is not particularly limited, and may be a reversed order from the order in this embodiment.

Fourth Step

Next, as illustrated in FIG. 6A, the green panel frame 19G is attached to the display module main body 11. At this time, as illustrated in FIG. 6B, the triangular first step portions 19*g*7 of the seventh plate portion 19G7 and the eighth plate portion 19G8 come into contact with the end faces of the blue panel frame 19B and the end faces of the red panel frame 19R, and the green panel frame 19G is fitted onto the display module main body 11 up to a position at which the second step portions 19*g*8 come into contact with portions of the third surface 15*c* of the prism 15.

At this time, a portion of the seventh plate portion 19G7 located inside the triangle forming the outer shape of the first step portion 19*g*7 is in contact with the fifth surface 15*e* of the prism 15, a portion of the eighth plate portion 19G8 located inside the triangle forming the outer shape of the first step portion 19*g*7 is in contact with the sixth surface of the prism 15, and a state is obtained in which the seventh plate portion 19G7 and the eighth plate portion 19G8 clamp the prism 15 from the outer sides of the fifth surface 15*e* and the sixth surface 15*f*. Since, in this way, there is no gap between the seventh plate portion 19G7 and the prism 15, and between the eighth plate portion 19G8 and the prism 15, the green panel frame 19G does not shift in the direction in which the seventh plate portion 19G7 and the eighth plate portion 19G8 face each other. Further, since the triangular-shaped first step portions 19*g*7 of the seventh plate portion 19G7 and the eighth plate portion 19G8 fit into triangular-shaped recessed portions formed by the end faces of the blue panel frame 19B and the end faces of the red panel frame 19R, the green panel frame 19G does not shift in a direction orthogonal to the direction in which the seventh plate portion 19G7 and the eighth plate portion 19G8 face each other.

On the other hand, when viewed from the normal direction of the seventh plate portion 19G7, a state is obtained in which a portion of the seventh plate portion 19G7 located outside the triangle forming the outer shape of the first step portion 19*g*7 overlaps with a portion of the first plate portion 19B1 of the blue panel frame 19B and a portion of the fourth plate portion 19R4 of the red panel frame 19R. As a result, the portion of the seventh plate portion 19G7 and the prism 15 clamp the portion of the first plate portion 19B1 and the portion of the fourth plate portion 19R4, and configure a first clamping portion 23 as illustrated in FIG. 6B.

Similarly, when viewed from the normal direction of the eighth plate portion 19G8, a portion of the eighth plate portion 19G8 located outside the triangle forming the outer shape of the first step portion 19*g*7 overlaps with a portion of the second plate portion 19B2 of the blue panel frame 19B and a portion of the fifth plate portion 19R5 of the red panel frame 19R. As a result, the portion of the eighth plate portion 19G8 and the prism 15 clamp the portion of the second plate portion 19B2 and the portion of the fifth plate portion 19R5, and configure a second clamping portion 24 as illustrated in FIG. 6B. In this way, the green panel frame 19G holds the blue panel frame 19B and the red panel frame 19R.

Further, the green panel frame 19G holds the green display panel 14G in a state in which the prism 15 is positioned between the seventh plate portion 19G7 and the eighth plate portion 19G8, and the ninth plate portion 19G9 is in contact with the green display panel 14G and faces the third surface 15*c* of the prism 15. At this time, the green panel frame 19G and the green display panel 14G are thermally coupled at the ninth plate portion 19G9.

Fifth Step

After attaching the green panel frame 19G to the display module main body 11, in the first clamping portion 23, the through hole 19*g*5 in the seventh plate part 19G7 of the green panel frame 19G and the through hole 19*b*5 in the first plate portion 19B1 of the blue panel frame 19B are formed to be coaxially positioned and form a single continuous through-hole. Further, the through hole 19*g*5 in the eighth plate portion 19G8 of the green panel frame 19G and the through hole 19*b*5 in the second plate portion 19B2 of the blue panel frame 19B, and the through-hole 19*g*5 in the eighth plate portion 19G8 of the green panel frame 19G and the through hole in the fifth plate portion 19R5 of the red panel frame 19R are also formed to be respectively coaxially positioned and form a single continuous through-hole, respectively.

Here, as illustrated in FIG. 7, a fixing pin 21 is inserted into each of the through holes 19*gb* penetrating through the green panel frame 19G and the blue panel frame 19B and each of the through holes 19gr penetrating through the green panel frame 19G and the red panel frame 19R, the through holes 19gb and the through holes 19gr being provided in the first clamping portion 23. Similarly, the fixing pin 21 is inserted into each of the through holes 19gb penetrating through the green panel frame 19G and the blue panel frame 19B and each of the through holes 19gr penetrating through the green panel frame 19G and the red panel frame 19R, the through holes being provided in the second clamping portion 24. As a result, a relative positional relationship between the green panel frame 19G, the blue panel frame 19B, and the red panel frame 19R is fixed, and the housing 12 is configured.

Sixth Step

Next, an adhesive is used to fix the housing 12 to the display module main body 11. At this time, it is desirable to apply the adhesive to the fifth surface 15e and the sixth surface 15f through which no light enters or exits, of the six surfaces of the prism 15, and fix each of the frames 19B, 19R, and 19G configuring the housing 12 to the prism 15. However, the position to which the adhesive is applied is not particularly limited.

Although the display module main body 11 and the housing 12 are fixed to each other after this step is completed, since the optical adhesive interposed between each of the display panels 14B, 14R, and 14G, and the prism 15 is not completely cured, the position of each of the display panels 14B, 14R, and 14G can be moved within a range of a dimensional margin between each of the display panels 14B, 14R, and 14G, and each of the frames 19B, 19R, and 19G.

Seventh Step

Next, positional alignment between the blue display panel 14B, the red display panel 14R, and the green display panel 14G is performed. At this time, for example, a chosen alignment pattern may be displayed on each of the display panels 14B, 14R, and 14G, and the position of each of the display panels 14B, 14R, and 14G may be finely adjusted, while observing an overlapping state of the three alignment patterns from the side of the fourth surface 15d of the prism 15 using a camera, so that the three alignment patterns are matched up with each other at a pixel level.

Eighth Step

Next, by completely curing the optical adhesive, each of the display panels 14B, 14R, and 14G is fixed to the prism 15.

By the above-described steps, the display module 10 of this embodiment is completed.

A configuration for attaching the display module 10 to the subframe 90 (support member) of the display device will be described below.

Figure 8:
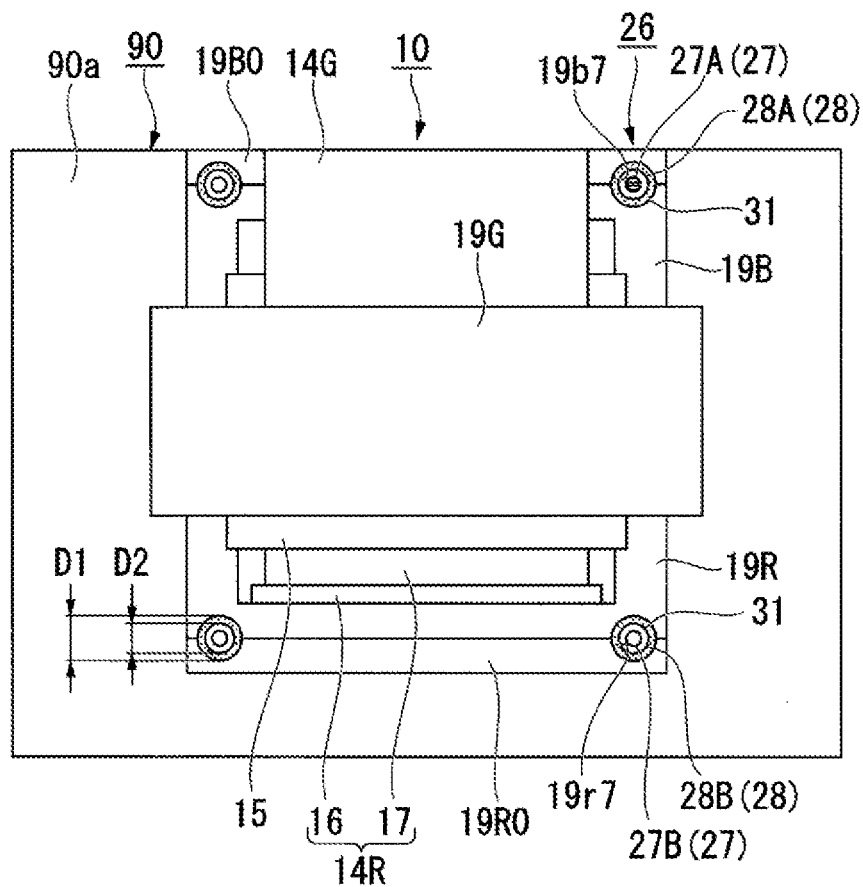
FIG. 8 is a front view illustrating the state in which the display module is attached to the support member.
Figure 9:
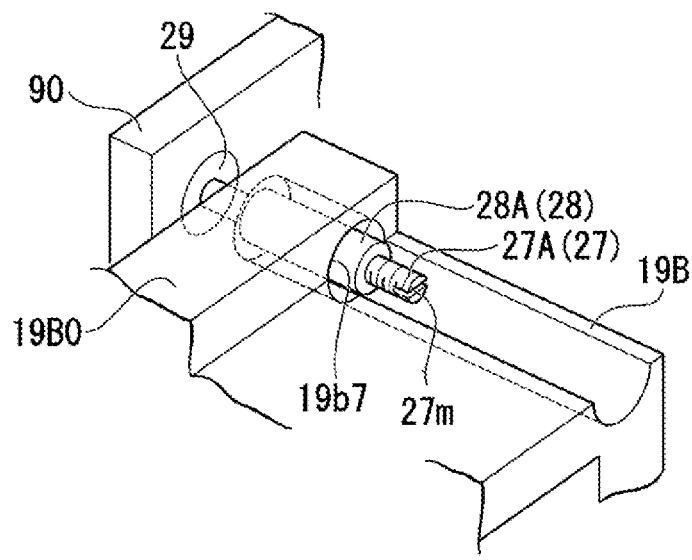
FIG. 9 is an enlarged view of a position adjustment mechanism.

FIG. 2 is a perspective view illustrating a state in which the display module 10 is attached to the subframe 90. FIG. 8 is a front view illustrating a state in which the display module 10 is attached to the subframe 90. FIG. 9 is an enlarged view of a positional adjustment mechanism 26.

As illustrated in FIG. 8 and FIG. 9, the display module 10 further includes the positional adjustment mechanism 26 in addition to the above-described display module main body 11 and housing 12. The positional adjustment mechanism 26 is used to adjust the position of the display module 10 with respect to the subframe 90.

Here, an attachment surface 90a of the subframe 90 to which the display module 10 is attached is denoted as a XY plane, which functions as a reference plane, two directions that are orthogonal to each other in the XY plane are defined as a X direction and a Y direction, and a direction orthogonal to the XY plane is defined as a Z direction. At this time, functions of the above-described positional adjustment mechanism 26 are specifically described as follows. The positional adjustment mechanism 26 adjusts each of four items that are (1) the position of the display module 10 in the X and Y directions, (2) the rotation of the display module 10 in the XY plane, (3) the inclination of the display module 10 (a light emission surface of the prism 15) with respect to the XY plane, and (4) the position of the display module 10 in the Z direction.

The positional adjustment mechanism 26 includes a plurality of through holes 19b7 and 19r7, a plurality of pins 27, and a plurality of sleeves 28.

As illustrated in FIG. 2, the display module 10 is attached to the subframe 90 (the support member) of the display device via the first attachment portion 19B0 of the blue panel frame 19B and the second attachment portion 19R0 of the red panel frame 19R. The light guiding optical system (not illustrated), which is the subsequent stage of the display module 10, is fixed to the subframe 90, and an optical axis of the light guiding optical system is aligned with respect to the subframe 90. The display module 10 is provided with the plurality of through holes 19b7 and 19r7 for attaching the display module 10 to the subframe 90. Specifically, two of the through holes 19b7 are provided in the first attachment portion 19B0, and two of the through holes 19r7 are provided in the second attachment portion 19R0.

Each of the plurality of pins 27 is provided at a position corresponding to each of the plurality of through holes 19b7 and 19r7. One end of each of the pins 27 is fixed to the subframe 90. Specifically, while four of the pins 27 are fixed to the subframe 90, one of the pins 27 provided in the first attachment portion 19B0 is configured by a pin 27A having a surface on which a fine screw thread is formed, and the remaining three pins 27 are configured by pins 27B each having a smooth surface on which no screw thread is formed. Hereinafter, the pin 27 on which the screw thread is formed will be referred to as the diopter adjustment pin 27A, and the pins 27 on which the screw thread is not formed will be referred to as the attachment pins 27B.

As illustrated in FIG. 9, one end of the diopter adjustment pin 27A is fixed to the subframe 90 via a pedestal 29. By being held by the pedestal 29, the diopter adjustment pin 27A is configured to be rotatable, but not movable. Further, a groove 27m into which a screwdriver can be inserted is provided on the other end of the diopter adjustment pin 27A. As a result, a configuration is obtained in which, when the screwdriver is inserted into the groove 27m of the diopter adjustment pin 27A and rotated, the diopter adjustment pin 27A can rotate without moving. In contrast, one end of the attachment pin 27B illustrated in FIG. 8 is directly fixed to the subframe 90.

Each of the plurality of sleeves 28 is provided so as to correspond to each of the plurality of pins 27. Specifically, each of the sleeves 28 is slidably attached to each of the pins 27 along an extension direction of each of the pins 27. Further, of four of the sleeves 28, a screw thread that engages with the screw thread of the diopter adjustment pin 27A is formed in an inner surface of a sleeve 28A into which the diopter adjustment pin 27A is inserted. In contrast, an inner surface of sleeves 28B into which the attachment pins 27B are inserted is a smooth surface.

As illustrated in FIG. 8, an inner diameter D1 of each of the through-holes 19b7 and 19r7 is larger than an outer diameter D2 of each of the sleeves 28. In other words, a gap is provided between each of the through-holes 19b7 and 19r7 and each of the sleeves 28. After adjusting the position of the display module 10 according to a method, which will be described below, the gaps between the through holes 19b7 and 19r7 and the sleeves 28 are filled with an adhesive 31, and the sleeves 28 are fixed to the display module 10. As a result, the display module 10 is configured to be movable along the pins 27 via the sleeves 28.

A method for adjusting the position of the display module 10 having the above-described configuration will be described.

First Step

First, a state is maintained in which the gap between each of the through-holes 19b7 and 19r7 and each of the sleeves 28 is not filled with the adhesive 31. In this state, the display module 10 is disposed above the subframe 90 so that the pins 27 and the sleeves 28 attached to the subframe 90 pass through the through holes 19b7 and 19r7. At this time, since there is the gap between each of the through-holes 19b7 and 19r7 and each of the sleeves 28, the position and inclination of the display module 10 with respect to the subframe 90 can be adjusted within a range of the gap. In this way, of the four items described above, three items can be adjusted, which are (1) the position of the display module 10 in the X and Y directions, (2) the rotation of the display module 10 in the XY plane, and (3) the inclination of the display module 10 with respect to the XY plane.

Second Step

Next, the gaps between the through-holes 19b and 19r7 and the sleeves 28 are filled with the adhesive 31, and the adhesive 31 is cured. As a result, the sleeves 28 are fixed to the display module 10. Then, the display module 10 becomes movable with the sleeves 28 along the pins 27. After the second step is completed, an optical axis of the display module 10 coincides with the optical axis of the light guiding optical system fixed to the subframe 90. Light emitted from the display module 10 is collimated and incident on the light guiding optical system.

Third Step

Next, a focus position of the display module 10 is adjusted to adjust the diopter. At this time, the screwdriver is inserted into the groove 27m of the diopter adjustment pin 27A, and the diopter adjustment pin 27A is rotated by the screwdriver. At this time, since the diopter adjustment pin 27A and the sleeve 28A are threaded, the sleeve 28A moves along the diopter adjustment pin 27A by a distance corresponding to the rotational amount of the diopter adjustment pin 27A. Further, the sleeve 28B around the attachment pin 27B also moves along the attachment pin 27B in conjunction with this movement. As a result, the display module 10 moves in the optical axis direction of the display module 10. In this way, the above-described item (4), namely, the position of the display module 10 in the Z direction can be adjusted.

In the display module 10 of this embodiment, the frames 19B, 19R, and 19G that hold the display panels 14B, 14R, and 14G, respectively, are configured by three plate portions, and at a point in time before each of the display panels 14B, 14R, and 14G is completely fixed to the prism 15, even if the point in time is after the display panels 14B, 14R, and 14G are held by the frames 19B, 19R, and 19G, respectively, it is still possible to finely adjust the position of each of the display panels 14B, 14R, and 14G and perform precise positional alignment between the display panels 14B, 14R, and 14G. Further, since the display panels 14B, 14R, and 14G are held by the frames 19B, 19R, and 19G, respectively, it is easy to perform a positional alignment operation.

Further, the housing 12 is not a member that covers the whole of the three display panels 14B, 14R, and 14G, but has a configuration in which the three frames 19B, 19R, and 19G, which individually hold the three display panels 14B, 14R, and 14G, respectively, are combined together. As a result, it is possible to reduce the size and weight of the display device 10. In this way, according to this embodiment, it is possible to provide the display module 10 in which the positions of the plurality of display panels 14B, 14R, and 14G are easily aligned and which has a compact configuration.

Further, since the third plate portion 19B3 of the blue panel frame 19B is in contact with the blue display panel 14B, the blue panel frame 19B can hold the blue display panel 14B in a stable manner. Further, since the blue panel frame 19B is formed from a metal material having a high thermal conductivity, and is thermally coupled to the blue display panel 14B, heat generated in the blue display panel 14B can be conducted to the blue panel frame 19B, and the heat can be efficiently released to the outside from the blue panel frame 19B. As a result, an increase in the temperature of the blue display panel 14B is suppressed, and thus, light emission efficiency and reliability of the blue display panel 14B can be improved. The same effect as this is achieved for the red display panel 14R and the green display panel 14G.

In this embodiment, the configuration in which each of the display panel 14B, 14R, and 14G is directly in contact with each of the frames 19B, 19R, and 19G is described as an example. However, instead of this configuration, each of the display panels 14B, 14R, and 14G may be bonded to each of the frames 19B, 19R, and 19G via a thermally conductive adhesive. Even with this configuration, effects similar to the above-described effects can be achieved. In other words, it is desirable that each of the display panels 14B, 14R, and 14G be thermally coupled to each of the frames 19B, 19R, and 19G.

Further, since in the blue panel frame 19B, the step portions 19b6, which come into contact with the first surface 15a of the prism 15, are provided on the first plate portion 19B1 and the second plate portion 19B2 that face each other, the blue panel frame 19B can hold the blue display panel 14B in a stable manner. Further, by appropriately setting the dimension L1 from the first surface 19Ba of the third plate portion 19B3 to the step portion 19b6, the gap between the blue display panel 14B and the prism 15 can be appropriately managed including a case in which the gap is zero. The same effect as this is achieved for the red display panel 14R and the green display panel 14G.

Further, since the first clamping portion 23 and the second clamping portion 24 are provided in which, of the three frames 19B, 19R, and 19G, the portion of the green panel frame 19G and the prism 15 clamp the portion of the blue panel frame 19B and the portion of the red panel frame 19R, and since the through holes 19gb and 19gr are provided in the first clamping portion 23 and the second clamping portion 24 and the fixing pins 21 are provided in the through-holes 19gb and 19gr, each of the frames 19B, 19R, and 19G can be reliably fixed to each other, and the mechanical strength of the housing 12 can be secured.

Further, since the display module 10 includes the positional adjustment mechanism 26, the position of the display module 10 with respect to the subframe 90 along the optical axis direction of the display module 10 can be appropriately changed using the positional adjustment mechanism 26. As a result, a user of the display device can adjust the diopter using a simple tool, such as the screwdriver, and visibility of a display image can be improved.

Second Embodiment

A second embodiment according to the present disclosure will be described below with reference to the drawings.

The display module 10 described in the above-described first embodiment is used in a display device to be described below.

Figure 10:
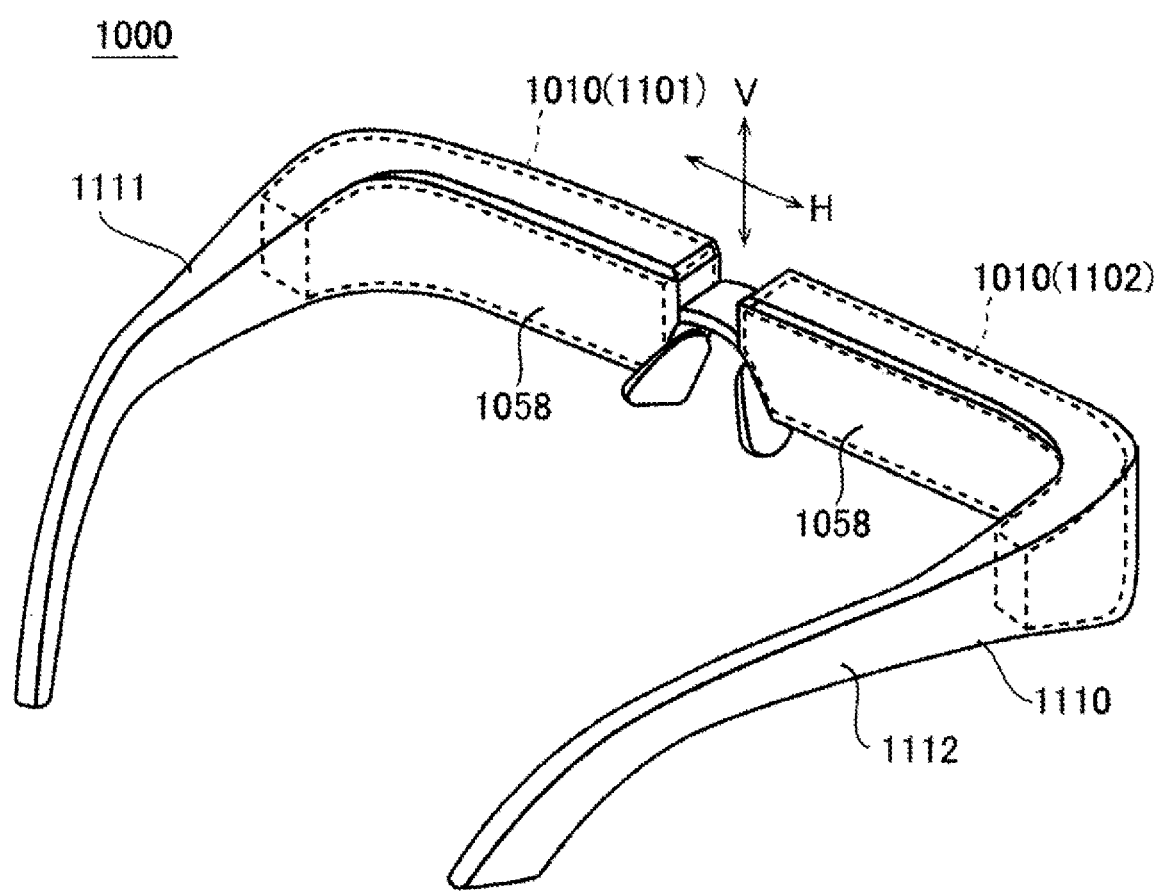
FIG. 10 is a schematic configuration view illustrating a head-mounted display device according to a second embodiment.
Figure 11:
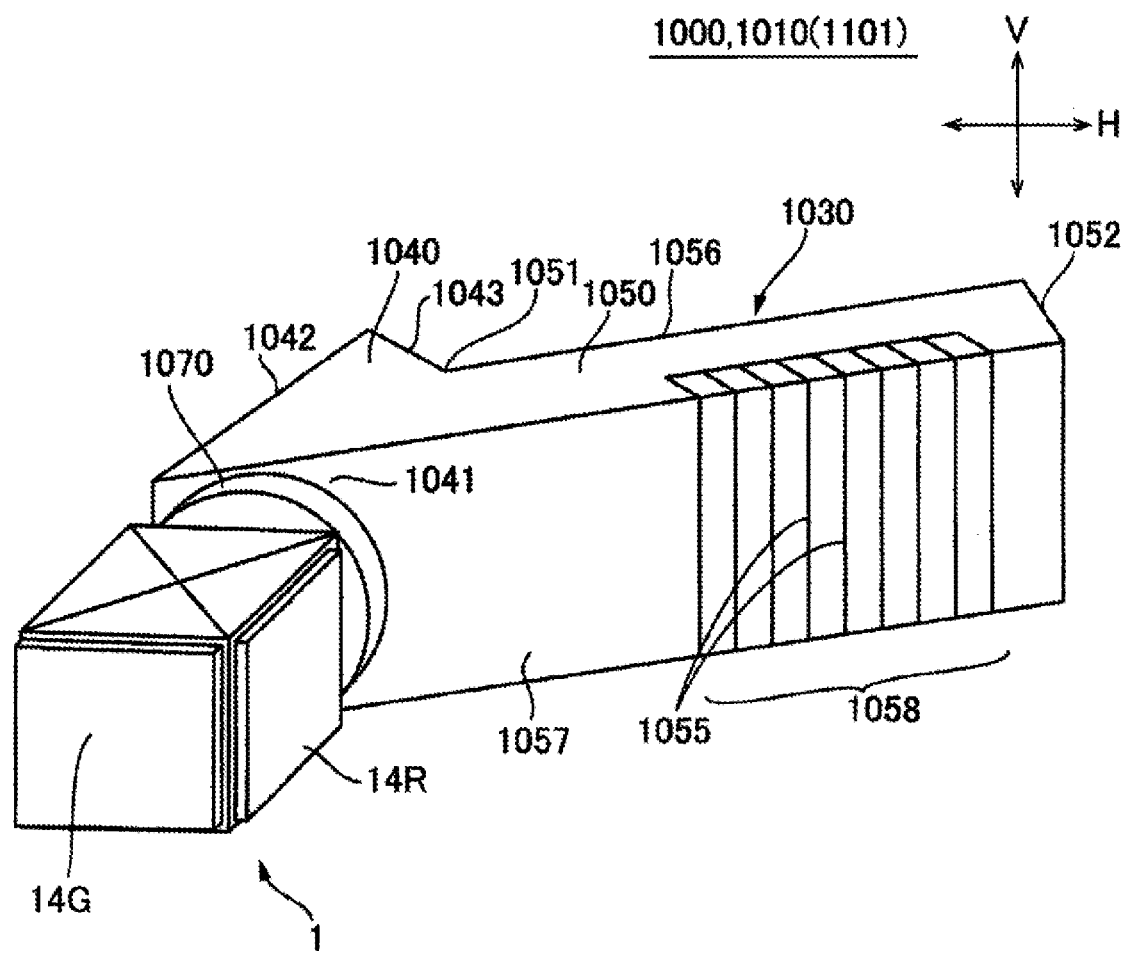
FIG. 11 is a perspective view schematically illustrating an optical system of the display device illustrated in FIG. 10.
Figure 12:
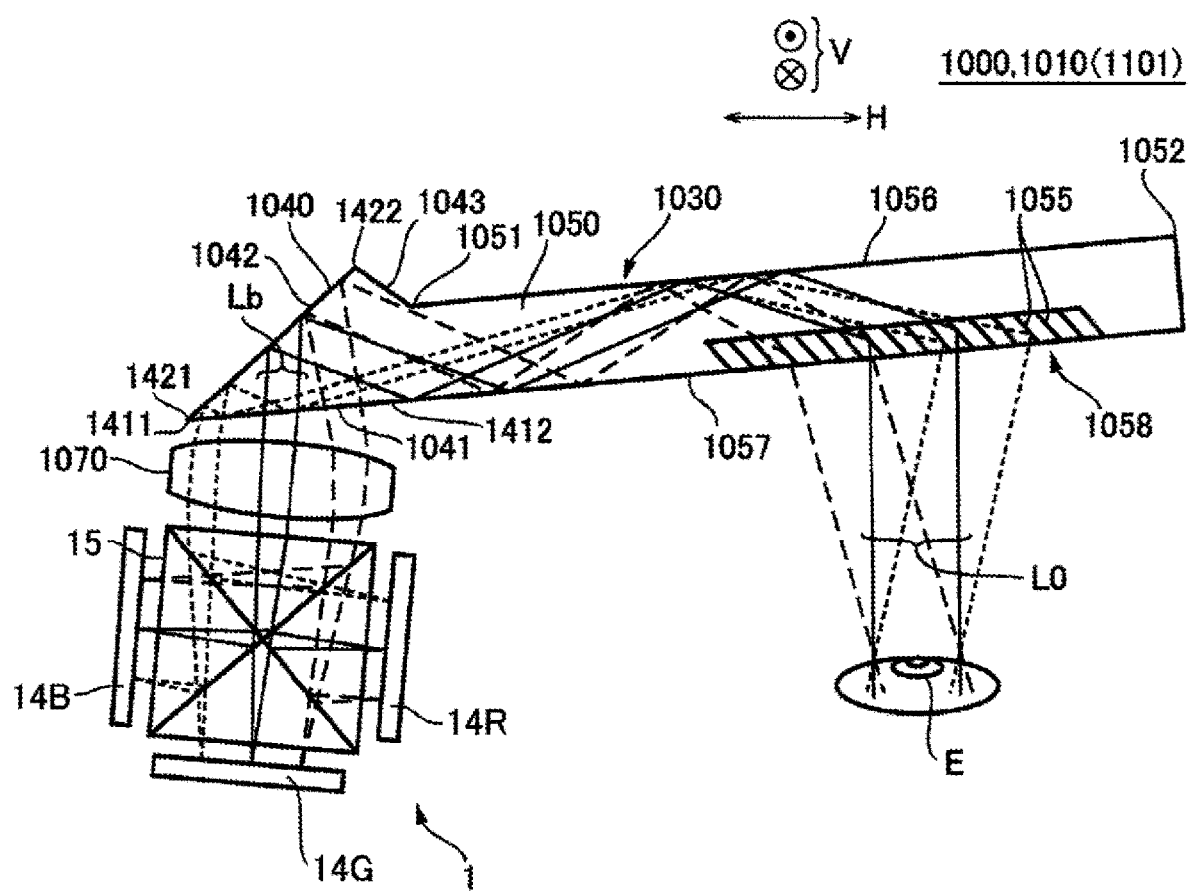
FIG. 12 is a diagram illustrating optical paths of the optical system illustrated in FIG. 11.

FIG. 10 is an explanatory diagram illustrating a head-mounted display device 1000 according to the second embodiment. FIG. 11 is a perspective view schematically illustrating a configuration of an optical system of virtual image display units 1010 illustrated in FIG. 10. FIG. 12 is an explanatory diagram illustrating optical paths of the optical system illustrated in FIG. 11.

As illustrated in FIG. 10, the head-mounted display device 1000 (an image display device) is configured as a see-through type eyeglass display, and includes a frame 1110 provided with left and right temples 1111 and 1112. In the head-mounted display device 1000, the virtual image display units 1010 are supported by the frame 1110, and an image emitted from the virtual image display units 1010 is caused to be recognized as a virtual image by a user. In this embodiment, the head-mounted display device 1000 is provided with a left-eye display unit 1101 and a right-eye display unit 1102 as the virtual image display units 1010. The left-eye display unit 1101 and the right-eye display unit 1102 have the same configuration, and are disposed left-right symmetrically.

In the following description, the left-eye display unit 1101 will be mainly described, and a description of the right-eye display unit 1102 will be omitted.

As illustrated in FIG. 11 and FIG. 12, in the head-mounted display device 1000, the left-eye display unit 1101 includes an image display module 1, and a light guiding system 1030 that guides synthesized light Lb emitted from the image display module 1 to an emitting portion 1058. A projection lens system 1070 is disposed between the image display module 1 and the light guiding system 1030, and the synthesized light Lb emitted from the image display module 1 enters the light guiding system 1030 via the projection lens system 1070. The projection lens system 1070 is configured by a single collimate lens that has a positive power.

The image display module 1 includes the prism 15, and the three display panels 14B, 14R, and 14G provided so as to face three surfaces of the four surfaces of the prism 15. The display panels 14B, 14R, and 14G are configured by organic EL panels, for example.

Imaging light emitted from the red display panel 14R enters the prism 15 as first imaging light LR in a first wavelength region. Imaging light emitted from the blue display panel 14B enters the prism 15 as second imaging light LB in a second wavelength region. Imaging light emitted from the green display panel 14G enters the prism 15 as third imaging light LG in a third wavelength region. The synthesized light Lb in which the first imaging light LR, the second imaging light LB, and the third imaging light LG are synthesized is emitted from the prism 15.

In this embodiment, the first wavelength region falls, for example, from 620 nm to 750 nm, and the red display panel 14R emits the first imaging light LR of red color. The second wavelength region falls, for example, from 450 nm to 495 nm, and the blue display panel 14B emits the second imaging light LB of blue color. The third wavelength region falls, for example, from 495 nm to 570 nm, and the green display panel 14G emits the third imaging light LG of green color. In this embodiment, the first imaging light LR, the second imaging light LB, and the third imaging light LG are light that does not have polarization characteristics.

The light guiding system 1030 includes a transmissive incidence portion 1040 from which the synthesized light Lb enters, and a transmissive light guiding portion 1050 having one end 1051 side thereof coupled to the incidence portion 1040. In this embodiment, the incidence portion 1040 and the light guiding portion 1050 are configured as an integrated light transmissive member.

The incidence portion 1040 includes an incident surface 1041 from which the synthesized light Lb emitted from the image display module 1 enters, and a reflection surface 1042 that reflects the synthesized light Lb that has entered from the incident surface 1041, the synthesized light Lb being reflected between the reflection surface 1042 and the incident surface 1041. The incident surface 1041 is a flat surface, an aspherical surface, a free form surface, or the like, and faces the image display module 1 via the projection lens system 1070. The projection lens system 1070 is disposed obliquely so that an interval between the projection lens system 1070 and an end portion 1412 of the incident surface 1041 is larger than an interval between the projection lens system 1070 and an end portion 1411 of the incident surface 1041. Although no reflection film is formed on the incident surface 1041, the incident surface 1041 fully reflects light that enters at an incident angle equal to or greater than a critical angle. Thus, the incident surface 1041 has light transmissive and light reflecting properties. The reflection surface 1042 is a surface that faces the incident surface 1041, and is disposed obliquely so that an end portion 1422 is located further away from the incident surface 1041 than an end portion 1421 of the incident surface 1041. Thus, the incidence portion 1040 has a substantially triangular shape. The reflection surface 1042 is a flat surface, an aspherical surface, a free form surface, or the like. The reflection surface 1042 has a configuration in which a reflective metal layer made, mainly, of aluminum, silver, magnesium, chrome or the like, is formed.

The light guiding portion 1050 includes a first surface 1056 (a first reflection surface) that extends from one end 1051 toward the other end 1052 side, a second surface 1057 (a second reflection surface) that faces the first surface 1056 in a parallel manner and extends from the one end 1051 side toward the other end 1052 side, and an emitting portion 1058 provided on a portion of the second surface 1057 that is separated from the incidence portion 1040. The first surface 1056 and the reflection surface 1042 of the incidence portion 1040 are joined together via a sloped surface 1043. A thickness of the first surface 1056 and the second surface 1057 is thinner than that of the incident portion 1040. The first surface 1056 and the second surface 1057 reflect all the light that is incident at an incident angle equal to or greater than the critical angle, based on a refractive index difference between the light guide portion 1050 and the outside (the air). Thus, no reflection film is formed on the first surface 1056 and the second surface 1057.

The emitting portion 1058 is configured on a portion of the light guiding portion 1050 on the second surface 1057 side in the thickness direction. In the emitting portion 1058, a plurality of partial reflection surfaces 1055 that are angled obliquely in the normal direction with respect to the second surface 1057 are arranged to be mutually parallel to each other. The emitting portion 1058 is a portion of the second surface 1057 that overlaps with the plurality of partial reflection surfaces 1055, and is a region that has a predetermined width in an extending direction of the light guiding portion 1050. Each of the plurality of partial reflection surfaces 1055 is formed by a dielectric multilayer film. In addition, at least one of the plurality of partial reflection surfaces 1055 may be a composite layer including a dielectric multilayer film and a reflective metal layer (thin film) made mainly of aluminum, silver, magnesium, chrome, or the like. When the partial reflection surface 1055 is configured to include a metal layer, it is possible to obtain an effect of enhancing the reflectance of the partial reflection surface 1055, or to obtain an effect of optimizing the incident angle dependence or the polarization dependence of the transmittance and the reflectance of the partial reflection surface 1055. Note that the emitting portion 1058 may have a mode in which an optical element such as a diffraction grating and a hologram is provided.

In the display device 1000 configured in the above-described manner, the synthesized light Lb consists of the parallel light that enters from the incidence portion 1040, is refracted on the incident surface 1041, and travels toward the reflection surface 1042. Next, the synthesized light Lb is reflected on the reflection surface 1042, and travels toward the incident surface 1041 again. At this time, since the synthesized light Lb enters the incident surface 1041 at the incident angle equal to or greater than the critical angle, the synthesized light Lb is reflected on the incident surface 1041 toward the light guiding portion 1050, and travels toward the light guiding portion 1050. Note that the incidence portion 1040 is configured such that the synthesized light Lb that is the parallel light enters the incident surface 1041. However, it may be possible to employ a configuration in which the incident surface 1041 and the reflection surface 1042 are configured to have a free form curve or the like, and after the synthesized light Lb, which is non-parallel light, enters the incident surface 1041, the synthesized light Lb is reflected between the reflection surface 1042 and the incident surface 1041 to be converted into the parallel light while being reflected.

In the light guiding portion 1050, the synthesized light Lb is reflected between the first surface 1056 and the second surface 1057, and advances. Then, part of the synthesized light Lb that enters the partial reflection surface 1055 is reflected on the partial reflection surface 1055 and is emitted from the emitting portion 1058 toward an eye E of an observer. Further, the rest of the synthesized light Lb incident on the partial reflection surface 1055 passes through the partial reflection surface 1055 and is incident on the next, adjacent, partial reflection surface 1055. Thus, the synthesized light Lb that is reflected on each of the plurality of partial reflection surfaces 1055 is emitted from the emitting portion 1058 toward the eye E of the observer. This enables the observer to recognize a virtual image.

At this time, as for the light entering the light guiding portion 1050 from the outside, this light passes through the partial reflection surfaces 1055 after entering the light guiding portion 1050, and reaches the eye E of the observer. This enables the observer to see the color image emitted from the image display module 1 and also see the scenery of the outside world and the like in a see through manner.

The head-mounted display device 1000 according to the second embodiment is provided with the display module according to the first embodiment, and hence, provides excellent display quality.

Note that the technical scope of the present disclosure is not limited to the above-described embodiments, and various modifications can be made to the above-described embodiments without departing from the spirit and gist of the present disclosure.

For example, in the above-described embodiments, in the first clamping portion and the second clamping portion, a combination of the through holes and the fixing pins is used as the configuration for mutually coupling the green panel frame, the blue panel frame, and the red panel frame together. Instead of this configuration, a fitting portion that causes the green panel frame and the blue panel frame, and the green panel frame and the red panel frame to be mutually coupled together may be provided in each of the frames. The frames are mutually coupled by the fitting portions, such as a recessed portion provided in the green panel frame and a convex portion provided in the blue panel frame, being fitted to each other.

Further, as an example of the display module of the above-described embodiments, the configuration is described in which the display module is provided with the three display elements configured by the blue display panel, the red display panel, and the green panel, and the prism, but the display module may have a configuration in which the display module is provided with two display elements and a prism. For example, the two display elements may be a first display element with organic EL elements that emit blue light and organic EL elements that emit red light provided on one panel, and a second display element provided with organic EL elements that emits green light.

Further, in the above-described embodiments, the configuration is described, as an example, in which the display panel includes the two substrates, namely, the element substrate and the sealing substrate, and the sealing substrate is bonded to the prism. However, instead of this configuration, the display panel need not necessarily include the sealing substrate, and a side of the element substrate on which the organic EL elements are formed may be directly bonded to the prism.

Further, in the above-described embodiment, as an example of the display module, the configuration obtained by combining the organic EL panels and the prism is described. However, the display element is not limited to the organic EL panel, and a self light-emitting panel, such as an inorganic EL panel or a micro LED panel, may be used as the display element. Further, instead of the self light-emitting panel that emits imaging light that does not have the polarization characteristics, a display element that emits imaging light that has the polarization characteristics, such as a liquid crystal panel, may be used.

In addition, it is possible to change, as appropriate, the material, number, arrangement, shape, or other specific configurations of each constituent element of the display module and the display device exemplified in the above-described embodiments.

Further, examples of the display device provided with the display module described in the above-described embodiments include the head-up display and the like, as well as the head-mounted display.

What is claimed is:

1. A display module comprising:
   a display module main body; and
   a housing provided to the display module main body, wherein
   the display module main body includes a first display element, a second display element, and a prism configured to synthesize first light emitted from the first display element and second light emitted from the second display element,
   the housing includes a first frame that holds the first display element in a state in which the first display element faces a first surface of the prism, and a second frame that holds the second display element in a state in which the second display element faces a second surface of the prism, the first frame includes a first plate portion and a second plate portion facing each other, and a third plate portion that couples the first plate portion and the second plate portion to each other, the second frame includes a fourth plate portion and a fifth plate portion facing each other, and a sixth plate portion that couples the fourth plate portion and the fifth plate portion to each other, at least one of the first frame and the second frame includes an attachment portion for attaching the display module main body to a support member, the first frame holds the first display element in a state in which the prism is positioned between the first plate portion and the second plate portion, and in which the third plate portion is in contact with the first display element and faces the first surface, and the second frame holds the second display element in a state in which the prism is positioned between the fourth plate portion and the fifth plate portion, and in which the sixth plate portion is in contact with the second display element and faces the second surface.

2. The display module according to claim 1, wherein
the first frame and the second frame contain metal material,
the first frame and the first display element are thermally coupled, and
the second frame and the second display element are thermally coupled.

3. The display module according to claim 1, wherein
each of the first plate portion and the second plate portion of the first frame is provided with a step portion that defines, by coming into contact with a portion of the first surface of the prism, a distance between the first display element and the first surface, and
each of the fourth plate portion and the fifth plate portion of the second frame is provided with a step portion that defines, by coming into contact with a portion of the second surface of the prism, a distance between the second display element and the second surface.

4. The display module according to claim 1, wherein
the display module main body further includes a third display element,
the prism synthesizes the first light, the second light, and third light emitted from the third display element,
the housing further includes a third frame that holds the third display element in a state in which the third display element faces a third surface of the prism,
the third frame includes a seventh plate portion and an eighth plate portion facing each other, and a ninth plate portion that couples the seventh plate portion and the eighth plate portion to each other, and the third frame holds the third display element in a state in which the prism is positioned between the seventh plate portion and the eighth plate portion, and in which the third plate portion is in contact with the third display element and faces the third surface.

5. The display module according to claim 4, wherein
the third frame contains metal material, and
the third frame and the third display element are thermally coupled.

6. The display module according to claim 4, wherein each of the seventh plate portion and the eighth plate portion of the third frame is provided with a step portion that defines, by coming into contact with a portion of the third surface of the prism, a distance between the third display element and the third surface.

7. The display module according to claim 4, wherein
the first surface and the second surface of the prism face each other, and the third surface is positioned in a direction intersecting the first surface and the second surface, and
a first clamping portion or a second clamping portion is provided, the first clamping portion being configured such that a portion of the seventh plate portion and the prism clamp a portion of the first plate portion and a portion of the fourth plate portion, and the second clamping portion being configured such that a portion of the eighth plate portion and the prism clamp a portion of the second plate portion and a portion of the fifth plate portion.

8. The display module according to claim 7, wherein
the first clamping portion or the second clamping portion is provided with a through hole, and
the through hole is provided therein with a coupling member coupling the first frame and the third frame, and coupling the second frame and the third frame.

9. The display module according to claim 7, wherein the first clamping portion or the second clamping portion is provided with fitting portions that couple, by fitting with each other, the first frame and the third frame and couple the second frame and the third frame.

10. The display module according to claim 1, wherein the attachment portion is provided in each of the first frame and the second frame.

11. The display module according to claim 1, wherein the attachment portion is provided with a positional adjustment mechanism for adjusting a position of the display module main body with respect to the support member.

12. A display device comprising the display module according to claim 1.

* * * * *